(12) United States Patent
Chen et al.

(10) Patent No.: US 6,803,151 B2
(45) Date of Patent: Oct. 12, 2004

(54) ELECTRODE (75) Inventors: Rongrong Chen, Fishers, IN (US);
John Lewis Ayres, Cicero, IN (US)

(73) Assignee: Delphi Technologies, Inc., Troy, MI (US)

( * ) Notice: Subject to any disclaimer, the term of this patent is extended or adjusted under 35 U.S.C. 154(b) by 313 days.

(21) Appl. No.: 10/080,296

(22) Filed: Feb. 21, 2002

(65) Prior Publication Data

US 2003/0157405 A1 Aug. 21, 2003

(51) Int. Cl.[7] ............................................... H01M 4/66
(52) U.S. Cl. ...................... 429/245; 429/233; 429/228; 29/623.5; 427/126.1; 427/123
(58) Field of Search ................... 429/245, 233, 429/228; 29/623.5; 427/126.1, 123

(56) References Cited

U.S. PATENT DOCUMENTS

| | | | |
|---|---|---|---|
| 3,819,414 A | 6/1974 | Taylor | 429/238 |
| 3,966,495 A | 6/1976 | Eriksson | 136/27 |
| 4,064,035 A | 12/1977 | Fukasawa | 204/290 R |
| 4,215,189 A | 7/1980 | Bergum et al. | 429/217 |
| 4,324,848 A | 4/1982 | Will | 429/228 |
| 4,345,987 A | 8/1982 | Fukasawa et al. | 204/290 |
| 4,415,638 A | 11/1983 | Meighan et al. | 429/225 |
| 4,510,034 A | 4/1985 | Ohshima et al. | 204/290 |
| 5,143,806 A | 9/1992 | Bullock et al. | 429/228 |
| 5,391,280 A | 2/1995 | Shimamune et al. | 204/290 |
| 5,766,789 A | 6/1998 | James et al. | 429/44 |
| 5,834,141 A | 11/1998 | Anderson et al. | 429/245 |
| 5,895,732 A | 4/1999 | Clough | 429/204 |
| 5,952,123 A | 9/1999 | Hatanaka et al. | 429/217 |
| 6,114,067 A | 9/2000 | Knauer | 429/245 |
| 6,117,196 A | 9/2000 | Snyder et al. | 29/623.5 |
| 6,117,594 A | 9/2000 | Taylor et al. | 429/245 |
| 6,183,912 B1 | 2/2001 | Nazri | 429/231.8 |
| 6,190,799 B1 | 2/2001 | Clough | 429/215 |
| 6,225,005 B1 | 5/2001 | Shiomi et al. | 429/225 |
| 6,267,923 B1 | 7/2001 | Albert et al. | 420/564 |
| 6,274,021 B1 | 8/2001 | Pauling | 205/74 |
| 6,274,274 B1 | 8/2001 | Schaeffer et al. | 429/233 |
| 6,287,673 B1 | 9/2001 | Katsir et al. | 428/210 |

FOREIGN PATENT DOCUMENTS

| | | |
|---|---|---|
| DE | 2619113 | 11/1977 |
| DE | 19810226 | 9/1999 |
| EP | 0595385 | 5/1994 |
| GB | 708816 | 5/1954 |
| GB | 2209241 | 5/1989 |
| JP | 53-10830 | 1/1978 |
| JP | 11054115 | 2/1999 |
| WO | 92/17552 | 10/1992 |

OTHER PUBLICATIONS

Kwasnik J et al, "Investigations into the Electrochemistry of Recombinant, Sealed Lead/Acid Batteries"; Journal of Power Sources, Elsevier Sequoia S.A. Lausanne, Ch, vol. 42, No. 1/2, Jan. 29, 1993, pp. 165–171, XP000409223; ISSN: 0378–7753 * p. 166, paragraphs 1–7*.

(List continued on next page.)

*Primary Examiner*—Laura Weiner
(74) *Attorney, Agent, or Firm*—Jimmy L. Funke (57) ABSTRACT

An electrode comprising a noble-metal free grid comprising lead, wherein the grid has an essentially PbO free $PbO_2$ coating covering all, or essentially all of the surface of the grid. Also described is a method of forming an electrode, comprising applying an essentially PbO free $PbO_2$ coating to a noble-metal free grid comprising lead, wherein the coating covers all, or essentially all of the surface of the grid.

45 Claims, 8 Drawing Sheets

OTHER PUBLICATIONS

Database WPI, Section Ch, Derwent Publications Ltd., London, GB; An 1973–63609U; XP002241836 & JP 48 033453 B (YUASA Battery Co Ltd) * abstract *.

Database Inspec Online—Institute of Electrical Engineers, Stevenage, GB; Kim J H et al, "The influence of casting process on mechanical properties and corrosion behavior of Pb–1.35wt.% Sn–0.1wt.%Ca alloy"; Database accession No. 6752866 XP002254186 *abstract* ; & Scripta Materialia, Sep. 15, 2000, Elsevier for Board of Directors of ACTA Metall, USA, vol. 43, No. 7, pp. 617–621, ISSN: 1359–6462.

Kwasnik J et al, "Investigations into the Electrochemistry of Recombinant, Sealed Lead/Acid Batteries," Journal of Power Sources, Elsevier Sequoia S.A. Lausanne, CH, vol. 42 No. 1/2 , Jan. 29, 1993, pp 165–171.

Alexey A. Vertegel, Eric W. Bohannan, Mark G. Shumsky, and Jay A. Switzer, *Epitaxial Electrodeposition of Orthorhombic cx—$PbO_2$ on (100)–Oriented Single Crystal Au*, Journal of the Electrochemical Society, 148 (4), 2001, C253–C256.

Isamu Kurisawa, Masaaki Shiomi, Shigeharu Ohsumi, Masashi Iwata, Masaharu Tsubota, *Development of positive electrodes with an $SnO_2$ coating by applying a sputtering technique for lead–acid batteries*, Journal of Power Sources 95, 2001, 125–129.

ELECTRODE

BACKGROUND OF THE INVENTION

Electrochemical storage batteries, and in particular, lead sulfuric acid storage batteries are ubiquitous in automotive applications. These batteries have electrochemical cells developing about 2.15 Volts each. A generic lead acid battery cell has a positive electrode, a negative electrode, and aqueous sulfuric acid as part of the electrolyte. The electrodes are held in parallel and electrically isolated by a porous separator to allow free movement of charged ions. Generally, six of these cells are connected in series to produce the 12 Volts common in automobile systems.

Lead acid battery cells are quite unique because the electrolyte actively participates in the energy storage and release process, as represented schematically in Equations 1, 2, 3, and 4 below:

Electrolyte  Equation 1

Negative Electrode Equation 2

Positive Electrode Equation 3

Total Reaction Equation 4

Within the electrochemical cell, lead metal (Pb) supplied by the negative electrode reacts with the ionized sulfuric acid electrolyte to form various lead sulfates, generally represented herein (Equation 2) as $PbSO_4$. Charging of the battery cell via an external electrical current converts these sulfates into the positive active mass (hereinafter PAM), including electrically conductive lead dioxide ($PbO_2$ of Equation 3). In particular, charging of the cell converts the $PbSO_4$ into PAM, discharge releases the stored electrical potential when the PAM is converted back into PbSO4.

It is important to battery performance that the PAM be in physical and electrical contact with the positive electrode. Accordingly, the PAM must be supported by, adhered and/or attached to, and in electrical communication with the positive electrode for the battery to function properly. Separation of the PAM from the positive electrode results in poor battery performance and ultimately in battery failure, which is defined herein as a battery no longer suitable for its intended purpose. Battery performance is affected by the materials from which the positive electrode is formed, the physical configuration of the positive electrode, and the method by which a "green" metal grid (i.e., a bare metal grid or core) is converted into the positive electrode.

Green battery grids are typically lead alloys formed into a grid structure by a variety of methods. Historically, the processes by which green grids are made (i.e., transformed) into positive grid electrodes have a number of common steps including: pasting, steaming, curing, pickling and/or forming.

In pasting, a paste including water, sulfuric acid, lead and lead oxides is applied to the grid surface. The pasted grid may then be steamed (i.e., 100° C. and 100% humidity) to facilitate crystal growth within the paste. The grid is then cured at controlled temperature and humidity conditions to "set" the paste, wherein the paste is chemically transformed into sulfates, hydroxides, carbonates, and other lead compounds through a series of complex hydration reactions requiring the presence of water. These reactions take place within the paste itself, and between the paste and the grid metal. Importantly, curing produces a "corrosion layer" at the interface between the grid and the paste, which provides physical and electrical communication between the PAM and the positive grid electrode, as well as protection of the grid from attack by the electrolyte.

Once cured, the grids are assembled into a battery package and charging electrolyte added. By allowing the battery package to stand for a period of time, the grids are "pickled". An external electric current is then passed through the cells in the forming step, wherein a majority of the paste is converted into PAM. The charging electrolyte is then removed and the battery is filled with shipping electrolyte to render the battery ready for use.

Phenomena that have a negative effect on battery performance include fracture lines that form due to stress introduced into the PAM layer as it accumulates on the positive electrode during charging. Also, when the lead in the positive electrode grid reacts with water as shown in Equation 5 below:

Equation 5 di-electric (i.e., non-conductive) lead oxide (PbO) is formed on the surface of the grid, which renders the affected portion non-conductive, and impacts support of the PAM layer. The metal grid can also react with the sulfuric acid electrolyte to form pits through pores, cracks, or holes in the corrosion layer, and from non-uniformities in the chemical composition and microstructure of the layer. Pits destroy the interface between the grid and the PAM, break electrical communication, and destroy physical contact (i.e., support) between the positive electrode grid and the PAM layer. Accordingly, the afore mentioned phenomena, either alone or in combination, result in decreased battery performance (i.e., the cell losing its capacity to transfer and store electrical energy), which eventually leads to battery failure. While these phenomena are significant at room temperature, they become even more significant at higher operational temperatures.

The rates at which the afore mentioned chemical processes proceed is proportional to temperature. The higher the temperature, the faster the reaction rate (i.e., the higher the temperature, the more PAM that forms, the more PbO that forms, and the more pitting that takes place). Positive grid corrosion becomes particularly significant under "high temperature" conditions (defined herein as above 50° C.), which have become common in automotive applications as "under hood temperatures" rise due to automotive design trends and space limitations.

Accordingly, it is desirable to reduce or substantially eliminate high temperature effects on positive battery electrodes of lead acid batteries. In particular, to provide a longer useful-lifetime of the battery, preferably utilizing materials that provide an economic incentive in doing so.

SUMMARY OF THE INVENTION

Provided herein is an electrode including or having a noble-metal free grid containing lead, wherein the grid has an essentially PbO free $PbO_2$ coating covering all, or essentially all of the surface of the grid. Also disclosed is a method of forming an electrode that includes applying an essentially PbO free $PbO_2$ coating to the surface of a noble-metal free grid containing lead, wherein the coating covers all, or essentially all of the surface of the grid.

Furthermore a method of forming an electrode is disclosed including electrolytically depositing an essentially PbO free $PbO_2$ coating onto the surface of a noble-metal free grid containing lead, tin and calcium, wherein the essentially PbO free $PbO_2$ coating has a thickness not less than 5 microns and not more than 500 microns, and wherein the essentially PbO free $PbO_2$ coating covers all, or essentially all of the surface of the grid; applying a paste having lead and lead oxide to the surface of the coated grid to produce a pasted grid; optionally contacting the pasted grid with steam for at least about one hour to produce a steamed grid; curing the steamed grid at about 50 percent humidity and about 55° C. for at least 24 hours to produce a cured grid; followed by contacting the grid with aqueous sulfuric acid prior to passing an external electric current of sufficient voltage and amperage through the cured grid for a sufficient period of time to convert at least a portion of the applied paste into lead dioxide.

Also disclosed herein is a battery having a noble-metal free grid containing lead, wherein the grid has an essentially PbO free $PbO_2$ coating covering all, or essentially all of the surface of the grid. A method of making a battery is also disclosed including applying an essentially PbO free $PbO_2$ coating to the surface of a noble-metal free grid containing lead, wherein the coating covers all, or essentially all of the surface of the grid.

In addition, disclosed herein is a method of making a battery including electrolytically depositing an essentially PbO free $PbO_2$ coating onto the surface of a noble-metal free grid containing lead, tin and calcium, wherein the essentially PbO free $PbO_2$ coating has a thickness not less than 5 microns and not more than 500 microns, and wherein the essentially PbO free $PbO_2$ coating covers all, or essentially all of the surface of said grid; then applying a paste containing lead and lead oxide to the surface of the coated grid to produce a pasted grid; optionally contacting the pasted grid with steam for at least about one hour to produce a steamed grid; and then curing the steamed grid at about 50 percent humidity and about 55° C. for at least about 24 hours to produce a cured grid; followed by contacting the cured grid with aqueous sulfuric acid prior to passing an external electric current of sufficient voltage and amperage through the cured grid for a sufficient period of time to convert at least a portion of the applied paste into lead dioxide.

BRIEF DESCRIPTION OF THE DRAWINGS

The improved electrode will now be described, by way of example, with reference to the accompanying drawings, which are meant to be exemplary, not limiting, and wherein like elements are numbered alike in several figures.

DETAILED DESCRIPTION OF THE INVENTION

It has been discovered that a positive grid electrode having improved high temperature performance can be obtained by providing a substantially continuous, non-porous coating or layer of essentially PbO free $PbO_2$ directly onto the surface of the grid. Preferably, the essentially PbO free $PbO_2$ coating has a density and is non-porous so as to mitigate detrimental effects to battery performance. Also, the grid is preferably coated prior to pasting, steaming, curing, pickling, and/or forming by a controlled process that results in an electrically conductive surface that provides seed crystals that improve adhesion by actually facilitating PAM formation directly onto the grid. Thus, formation of an essentially PbO free layer of $PbO_2$ obtains beneficial mechanical and physiochemical properties consistent with high temperature performance.

Figure 1:
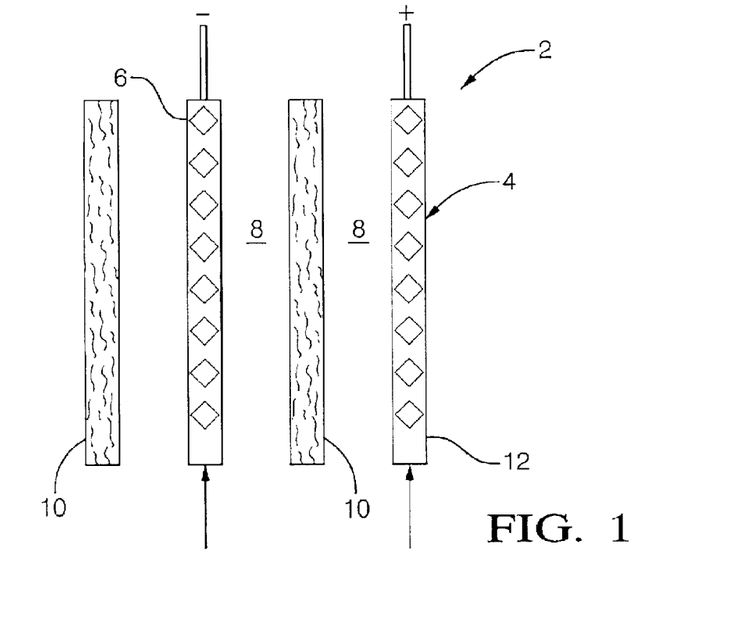
FIG. 1 is an expanded view of a lead acid battery cell.
Figure 2:
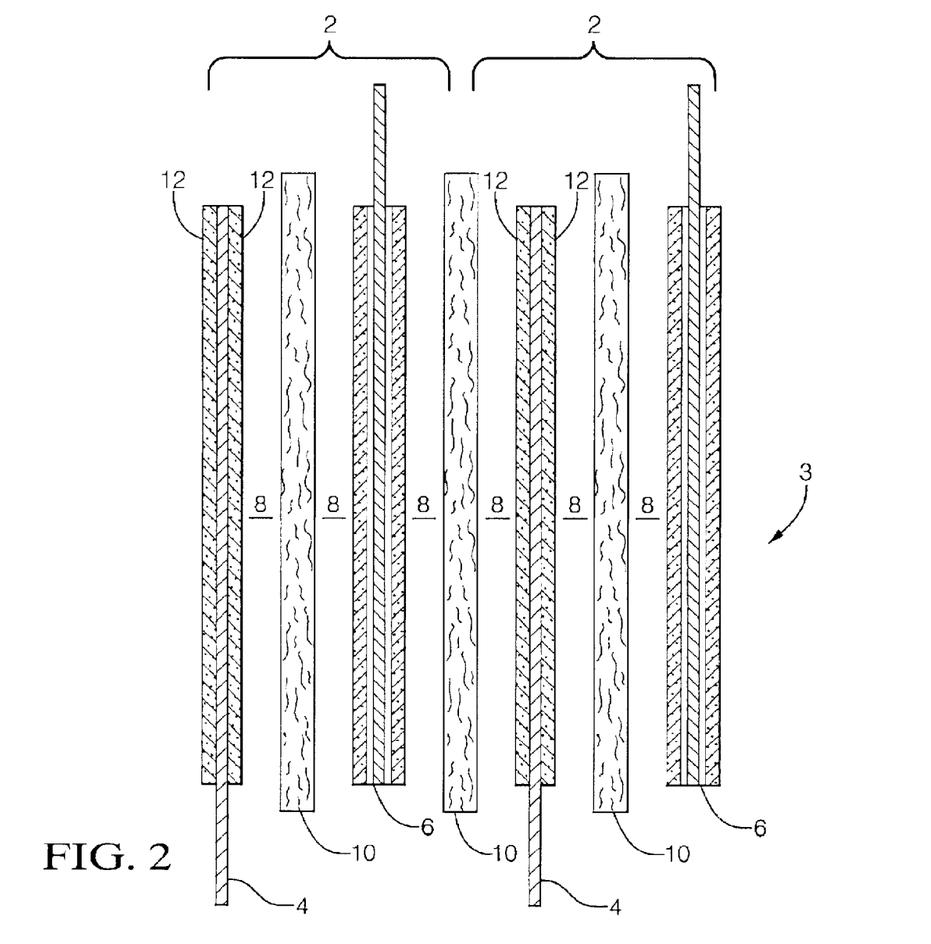
FIG. 2 is an expanded view of a lead acid battery using the cell of FIG. 1.

FIG. 1 depicts a generic lead acid battery cell 2, including a positive grid electrode 4, a negative grid electrode 6, and an electrolyte of aqueous sulfuric acid 8. The plates are held in parallel and electrically isolated by a porous separator 10 to allow free movement of charged ions. The positive active mass 12 is adhered to the surface of the positive grid electrode 4 (hereinafter grid 4). FIG. 2 depicts a lead acid battery 3 having a plurality of cells as shown in FIG. 1.

Figure 3:
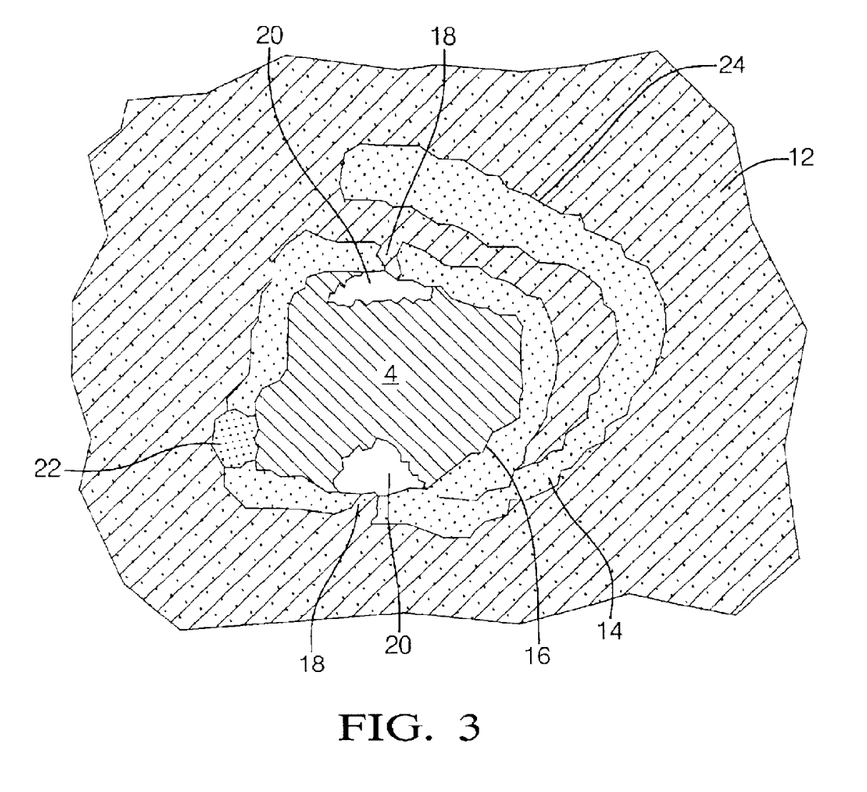
FIG. 3 is a cross sectional view of a Comparative Example battery electrode.

FIG. 3 depicts a cross section of a positive grid electrode 4 produced by the above-described historical process, wherein a corrosion layer 14 covers grid 4 at interface 16, and adhered to corrosion layer 14 is a layer of PAM 12. Also present in FIG. 3 are a fracture line 24, PbO deposit 22, pores, cracks, and/or holes 18 in corrosion layer 14, pits 20, and interface 16.

An historical process of producing the electrode depicted in FIG. 3 would include pasting, steaming, curing, pickling and forming as described above, specifically: pure lead would be converted into a 70–80% oxidized lead powder (lead oxide or leady oxide coating a metallic lead center) and mixed with water and $H_2SO_4$ under constant stirring at an elevated temperature to form a lead lead-oxide paste. Analysis of the paste would show a mixture of lead, lead oxide, lead sulfate, and basic lead sulfates such as $PbOPbSO_4$ (monobasic lead sulfate), $3PbOPbSO_4$ (tribasic lead sulfate), and $4PbOPbSO_4$ (tetrabasic lead sulfate). The paste would then be applied to a noble metal free expanded metal grids containing 98.4% lead, 0.08% calcium, and 1.5% tin ($Pb_{98.4}$—$Ca_{0.08}$—$Sn_{1.5}$). The pasted grids would then be steamed for four hours at 100° C. and 100% humidity. After being steamed, the grids would be cured for 4 days at 50% humidity and 55° C. The cured (set) grids then assembled into a battery and forming acid (aqueous sulfuric acid specific gravity (s.g.) of 1.190) added. The battery would be aged about 1 hour to pickle the grids prior to a three step forming process. Step one including application of a forming current between 20 and 25 amps at 14 volts to reach 100% of the theoretical capacity of the battery. Step two involves allowing the same battery to cool and rest for about 3 hours. Finally, a second forming current between about 10 and 22 amps would be applied in an amount equal to between 75% and 100% of the theoretical capacity of the battery. Once fully formed, the forming acid would be removed and the battery filled with shipping acid (aqueous sulfuric acid, specific gravity 1.28).

Figure 4:
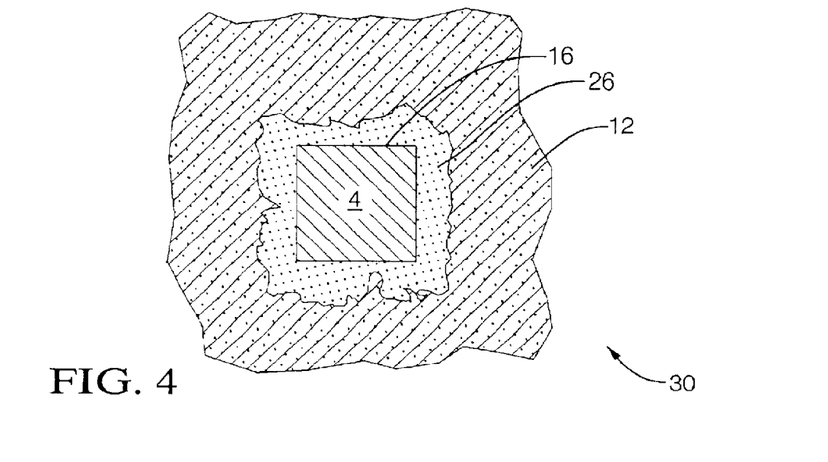
FIG. 4 is a cross sectional view of an exemplary embodiment of a coated battery electrode.

Referring now to FIG. 4, an exemplary embodiment as described herein of a coated electrode 30 is illustrated by way of a cross section having a suitable noble metal free positive grid electrode 4 with an essentially continuous PbO free coating of $PbO_2$ 26, to which the PAM 12 is adhered.

A suitable electrode grid has high electrical conductivity, mechanical strength sufficient to support the PAM, resistance to corrosion in sulfuric acid, and acceptable processability in formation of the grid. It has been discovered that grid composition and grid formation, both individually and in combination, affect the suitability of a grid. Specifically, while the properties of lead render it unacceptable because in short, pure lead grids simply fall apart during use, alloys of lead can be selected to impart desired properties lacking in pure lead to produce suitable grids.

Alloying metals include antimony (Sb), tin (Sn), silver (Ag), gold (Au), and calcium (Ca). Antimony alloys have been found to hydrolyze water during charging of the battery. Noble metal alloys (i.e., silver, gold and the like) may improve grid conductivity and corrosion resistance, however, noble metals are expensive, result in poor PAM adhesion, and can cause severe self discharge when present in the electrolyte in small amounts (i.e., >0.05 mg/l or more). Accordingly, the preferred grid material for use herein does not contain antimony and is noble metal free; defined herein as essentially free of noble metals in that while noble metals may naturally occur in trace amounts within the metal alloy, they are not intentionally added to the composition. Sn and Ca are used to prevent passivation of the corrosion layer, and impart conductivity, strength and processability into the lead alloy without detrimental side effects to battery performance. Thus, the preferred alloy for use herein includes lead, tin, and calcium (Pb—Sn—Ca). Preferably, the alloy includes an upper weight percent of lead (Pb Wt %) of about 99.5, with an upper Pb Wt % of about 99 desired, and an upper Pb Wt % of about 98.5 more desired. A lower Pb Wt % of about 50 can be employed, with a lower Pb Wt % of about 90 desired, and a lower Pb Wt % of about 98.3 more desired. Also, the alloy includes an upper weight percent of tin (Sn Wt %) of about 5, with an upper Sn Wt % of about 3 desired, and an upper Sn Wt % of about 2 more desired. A lower Sn Wt % of about 0.5 can be employed, with a lower Sn Wt % of about 1 desired, and a lower Sn Wt % of about 1.4 more desired. In addition, the alloy includes an upper weight percent of calcium (Ca Wt %) of about 1, with an upper Ca Wt % of about 0.5 desired, and an upper Ca Wt % of about 0.1 more desired. A lower Ca Wt % of about 0.01 can be employed, with a lower Ca Wt % of about 0.05 desired, and a lower Ca Wt % of about 0.07 more desired. The most preferred alloy composition includes 98.5 wt % Pb, 1.5 Wt % Sn, and 0.08 Wt % Ca ($Pb_{98.5}$—$Sn_{1.5}$—$Ca_{0.08}$).

Various processes may be used to form the green grid including, for example, casting, punching, and expanding metal. In casting, molten lead alloy, often containing Sb to improve castability, is fed into molds to produce a grid without significant mechanical fabrication. Punching uses a die to cut a desired shape out of a lead alloy strip. After being physically removed, the punched material is recycled. Both casting and punching result in a relatively dense grid having strength adequate for use in lead acid batteries (i.e., they provide support for the PAM). However, both processes are costly, time consuming, and may require alloys inconsistent with optimal battery performance.

The use of expanded metal techniques includes making partial cuts in a metal strip, and then stretching (i.e., expanding) the strip normal to the cuts to produce the desired grid shape. The tools and machinery required are expensive, the process is intricate, and the grids formed have strength normal to the direction in which the expansions were made, but not along the so-called "flow lines" that result parallel with the expansion event. However, the advantages of expanded metal grids include no physical removal of material, the grids are lighter, and have a higher surface area than grids made by the other two methods. Accordingly, expansion is the preferred method of producing the green grid for use herein.

Once formed, the grid must be coated with $PbO_2$. Preferably, the $PbO_2$ coating (item 26 of FIG. 4) is uniform in composition being essentially PbO free, which is important because non-conductive PbO has a detrimental effect on the conductivity of $PbO_2$. As such, an essentially PbO free $PbO_2$ coating useful herein has less than about 10 weight percent PbO, preferably less than about 5 weight percent PbO, most preferably less than about 1 weight percent PbO based on the total amount of PbO and $PbO_2$ present in the coating by weight. The purity of the coating can be determined by various methods including X-ray diffraction and by measuring the open circuit potential of the coated grid. For example, an essentially PbO free $PbO_2$ coating measured verses $Hg/Hg_2SO_4$ in a $H_2SO_4$ (1.280 s.g.) solution at 75° C., will have an open circuit potential at least about 1.0, preferably at least about 1.1, most preferably at least about 1.2 Volts; and an open circuit potential at most about 1.3, preferably at most about 1.25, most preferably at most about 1.23 Volts.

$PbO_2$ useful herein includes alpha-$PbO_2$ (also known as scrutinyite), which has a theoretical density of 9.825 grams per cubic centimeter (g/cc), and beta-$PbO_2$ (also known as plattnerite), which has a theoretical density of 9.4 (g/cc). It is believed that by using these "high density" $PbO_2$ materials, the coating provides improved protection of the electrode grid resulting in improved high temperature battery performance.

In one embodiment, alpha-$PbO_2$ is preferred because of its low reactivity and higher density as compared to beta-$PbO_2$. In this preferred embodiment, the $PbO_2$ coating includes at least about 90, preferably at least about 95, most preferably at least about 99 weight percent alpha-$PbO_2$, based on the total weight of $PbO_2$ in the layer.

In an alternate exemplary embodiment, the coating will have a greater content of beta-$PbO_2$ than alpha-$PbO_2$. It is believed the lower density of beta-$PbO_2$ (compared to alpha-$PbO_2$) renders the coating more corrosion-resistant and more conductive than alpha-$PbO_2$. In this alternate embodiment, the coating includes at least about 90, preferably at least about 95, most preferably at least about 99 weight percent beta-$PbO_2$, based on the total amount of $PbO_2$ present in the coating layer.

Furthermore, the $PbO_2$ coating preferably has an effective surface area larger than the geometric surface area of the grid. Most preferably, the essentially PbO free $PbO_2$ coating includes epitaxial columns of $PbO_2$ disposed normal to the surface of electrode grid 4 such that the $PbO_2$ coating has an effective surface area of at least about 10%, preferably at least about 30%, most preferably at least about 50% in excess of the total geometric surface area of the electrode grid. The $PbO_2$ coating also preferably covers all, or essentially all of electrode grid surface, such that the $PbO_2$ coating covers at least about 99%, preferably at least about 99.9%, most preferably at least about 99.99% of the grid surface, based on the total available surface area of the electrode grid. Also, the $PbO_2$ coating preferably has an average thickness of at least about 5, preferably at least about 10, most preferably at least about 15 microns as measured normal to the grid surface. The $PbO_2$ coating also has an average thickness of at most about 500 microns, preferably at most about 100 microns, most preferably at most about 50 microns.

Preferably, the $PbO_2$ coating 26 is uniform in composition, and is also continuous or essentially continuous over the covered surface of the grid. By essentially continuous, it is meant that a cross-section perpendicular to the grid surface yields a continuous interface layer at the boundary between the $PbO_2$ coating, and the grid over a particular distance when viewed at a defined magnification level (e.g., 80×, 80 times magnification). Accordingly, an essentially continuous coating is defined herein as being continuous at the interface over at least about 1 micron, preferably at least about 5 microns, most preferably at least about 15 microns when a cross section normal to the grid surface is viewed at 80× magnification. This definition accounts for the minor inconsistencies that occur within the coating layer, and how an essentially continuous PbO free $PbO_2$ layer is not flat, but is in-fact a web of interconnected epitaxial columns.

The essentially PbO free $PbO_2$ coating is also preferably non-porous, and has a density that approaches that of pure $PbO_2$. As used herein, porosity is determined at the grid-coating interface by quantifying the void area (area not occupied by the coating) as a percentage of the total area of the voids and the coating (i.e. % voids of the total area, hereinafter % void area). Preferably, the % void area is less than about 50, preferably less than about 30, most preferably less than about 20% of the total coating area. Related to porosity (% void area) is the density of the coating, which is at least about 8.5, preferably at least about 9.0, most preferably at least about 9.3 g/cc on average.

The coating layer may also include various amounts of additives including metal oxides that, for example, prevent passivation of the corrosion layer such as $SnO_2$ and the like; and/or that improve electrical conductivity, and/or increase the structural integrity of the coating, such as CaO and the like. These optional oxides are preferably present in the coating at less than about 10, preferably less than about 5, with a concentration of less than about 1 wt % of the total weight of the coating being most preferred.

Methods of applying the coating to the grid include both constant current and constant voltage electrolytic deposition, as well as non-electrolytic deposition processes. Once the grid has been coated, the grid may then be converted into a suitable battery electrode by subsequent processing including the afore mentioned pasting, steaming, curing, pickling and/or forming steps.

The following examples, which are presented in order that those skilled in the art may better understand how to practice the present invention. These examples are merely presented by way of illustration only, and are not intended to limit the invention thereto.

EXAMPLES

Example 1

Comparative Example

Comparative Example 1 is represents a historical electrode having the PAM layer removed. For purposes of testing, a test grid was prepared from a noble metal free expanded metal grid containing 98.4% lead, 0.08% calcium, and 1.5% tin ($Pb_{98.4}$—$Ca_{0.08}$—$Sn_{1.5}$) to have an apparent surface area of 12.69 $cm^2$. Using a $Hg/Hg_2SO_4$ reference, the test grid was evaluated with cycling voltametry at 75° C. in aqueous $H_2SO_4$ (1.280 s.g.). The electrode potential was scanned from about 0.9 V (discharged)to about 1.3 V (overcharged) at 1 mV/sec for a total of 432 cycles. The test grid was then cleaned, sectioned, and evaluated via microscopy.

Example 2

Preferred Embodiment

Example 2 represents a preferred embodiment of a coated grid electrode as disclosed herein. The essentially continuous coating having a uniform composition of essentially PbO free $PbO_2$ was electrochemically deposited (coated) onto the surface of a grid identical to the grid used in Comparative Example 1 (i.e., an expanded metal $Pb_{98.4}$—$Ca_{0.08}$—$Sn_{1.5}$ grid). The coating was applied using a constant anodic current density of 14 $mA/cm^2$ at 25° C., over a 60 minute period from a 0.1 M $Pb(NO_3)_2$ solution in 5M NaOH Using a pure lead strip with a surface area 60 $cm^2$ as a counter electrode, and a saturated calomel electrode as the reference electrode,. FIGS. 5, 6, 10, 12 and 13 show the $PbO_2$ coating of Example 2.

The coated grid was then subjected to the same conditions as was Comparative Example 1. After the cycling voltametry evaluation, the electrode was cleaned, sectioned, and evaluated via microscopy along with Comparative Example 1.

Evaluation of Data

Figure 5:
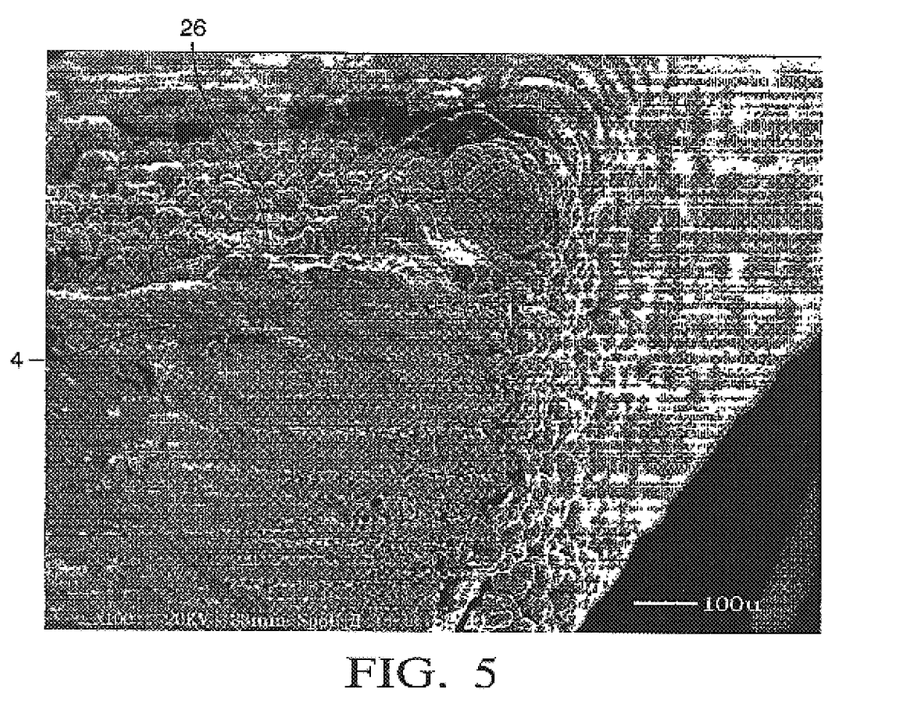
FIG. 5 is a metallography image taken by scanning electron microscopy at 100× magnification of the exemplary embodiment of Example 2.
Figure 6:
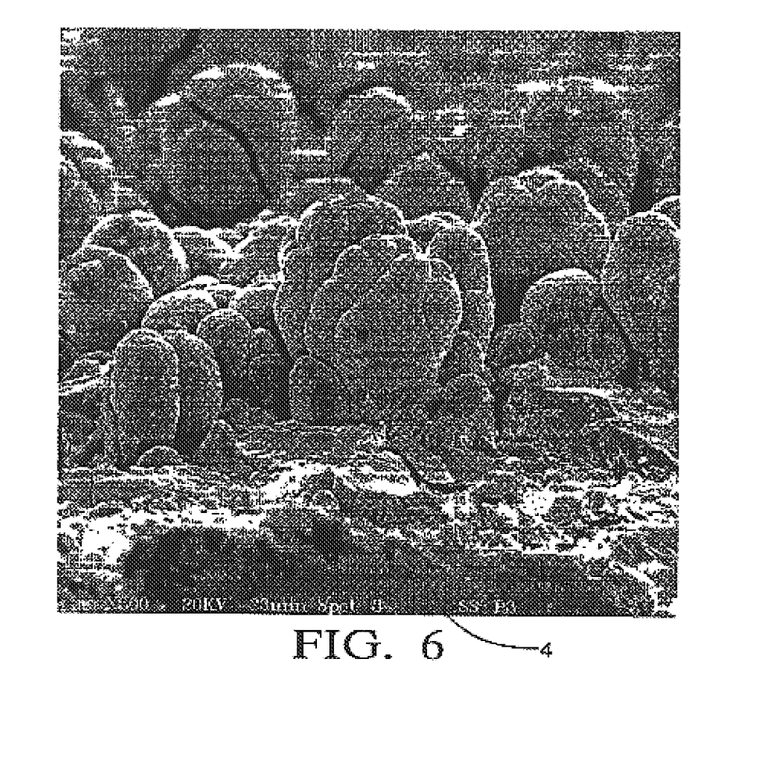
FIG. 6 is a metallography image of FIG. 5 at 500× magnification.
Figure 7:
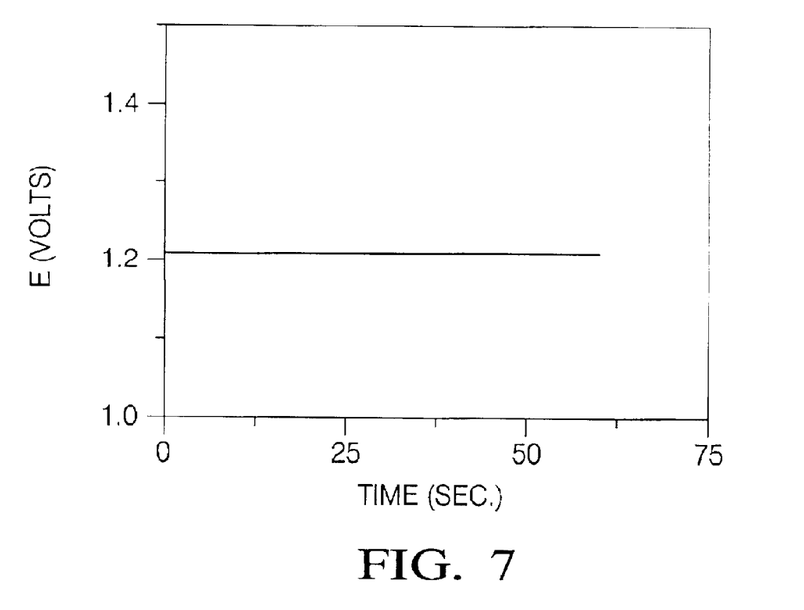
FIG. 7 is a graph illustrating the open circuit potential of Example 2.
Figure 12:
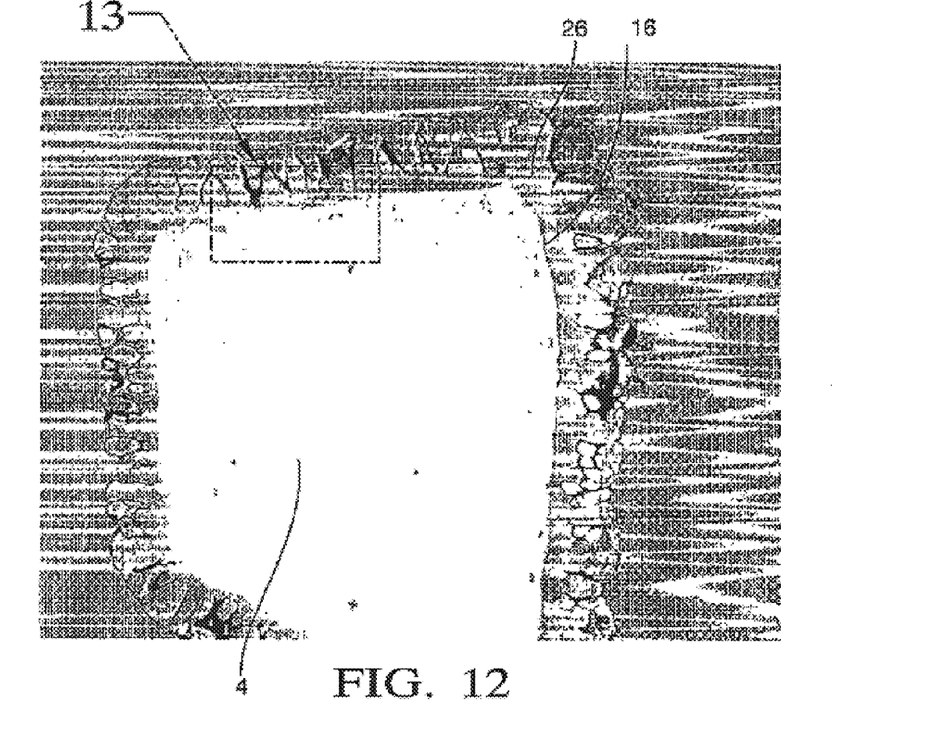
FIG. 12 is a metallography image of a cross section of the exemplary embodiment of Example 2 at 80× magnification taken by scanning electron microscopy.
Figure 13:
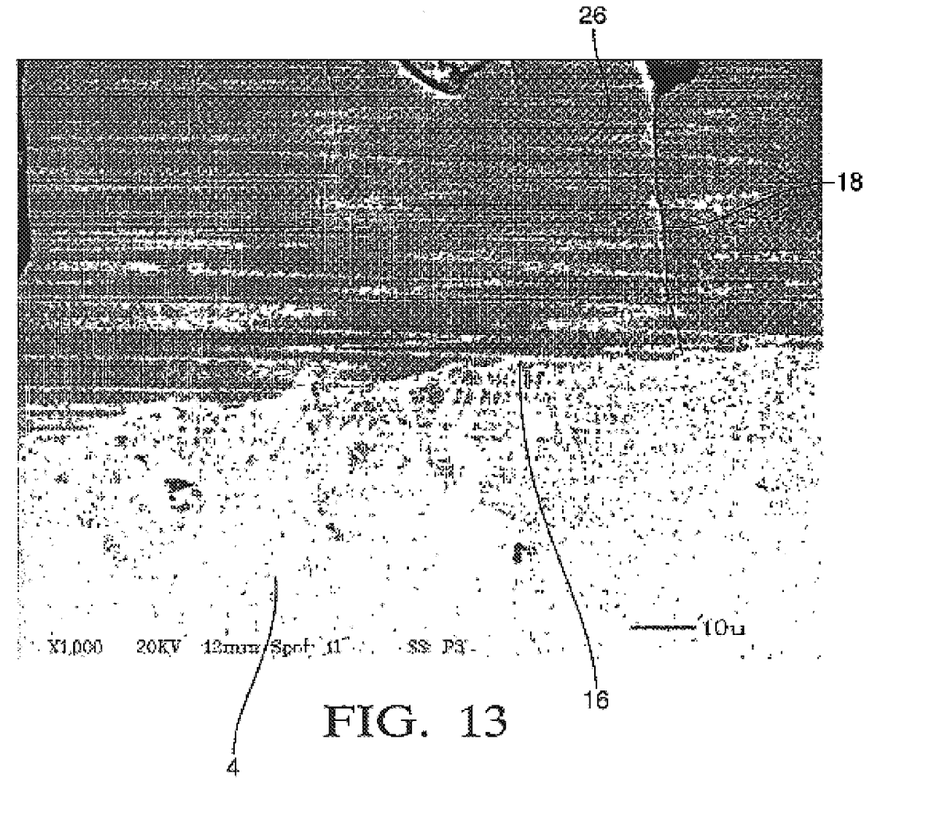
FIG. 13 is a metallography image taken by scanning electron microscopy of section A of FIG. 12 at 1000× magnification.
Figure 14:
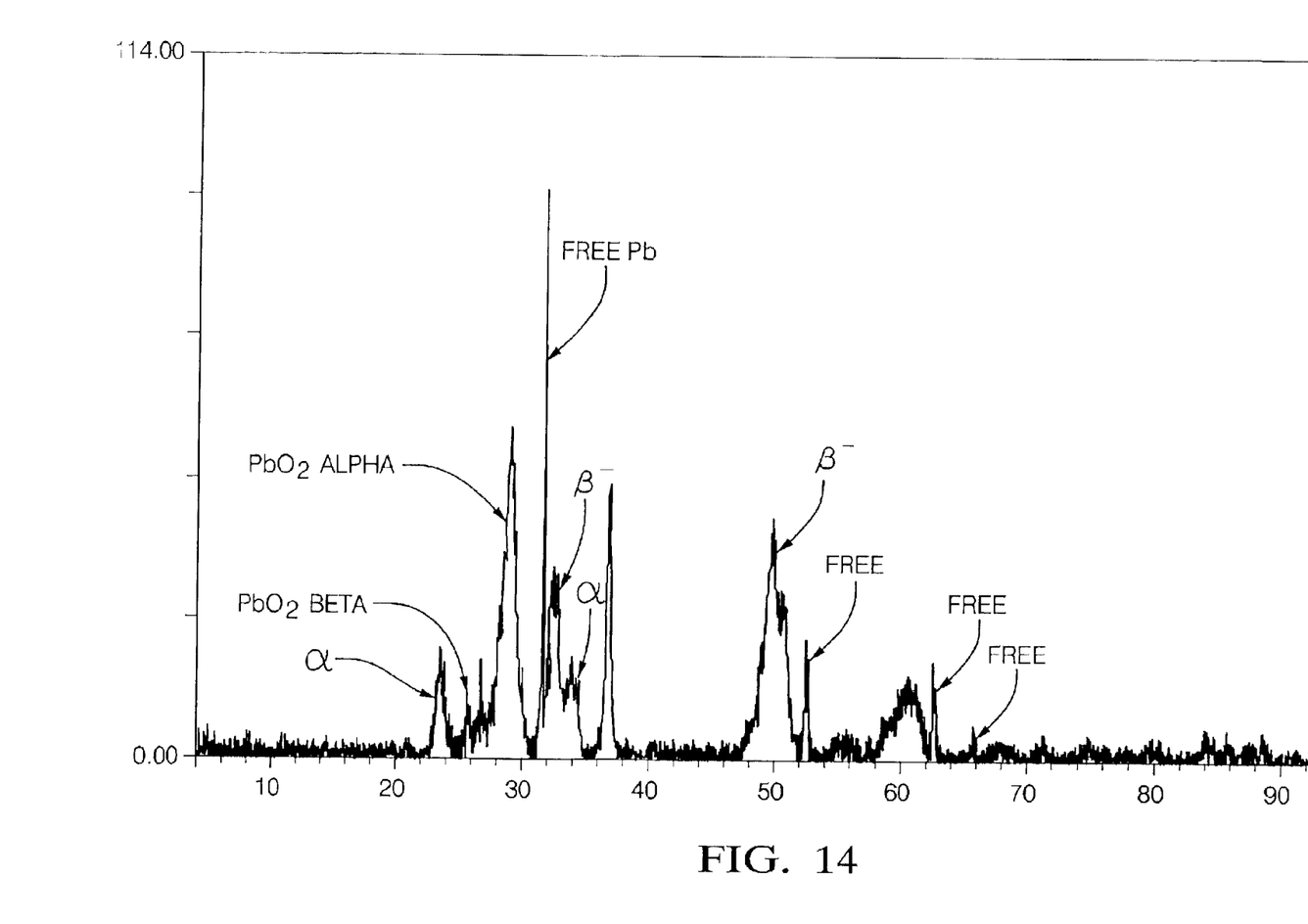
FIG. 14 represents the X-ray diffraction analysis of the $PbO_2$ coating of Example 2.

FIG. 5 shows the coating of Example 2 at 100× magnification by scanning electron microscopy (SEM). FIG. 6 is a portion of FIG. 5 at 500× magnification by SEM. Both show the columnar crystalline structure of the $PbO_2$ coating of the above the grid. FIG. 7 is a graphical representation of the open cell voltage of the coated grid of Example 2, indicative of pure alpha-$PbO_2$, which has a theoretical value of 1.23 Volts. FIGS. 12 and 13 show a cross section of the coated grid of Example 2 at 80× and 1,000× magnification respectively, wherein the non-uniform coating epitaxial columnar crystalline structure of the coating can be seen surrounding the grid. FIG. 13 shows the interface 16 between the grid 4 and the essentially PbO free $PbO_2$ coating 26. Even though cracks and/or pores 18 can be seen in the coating, the grid is essentially continuous over more than 10 microns at 1,000×, which is far in excess to 1 micron at 80. FIG. 14 represents X-ray diffraction analysis of the coating, which confirms the coating is essentially PbO free alpha-$PbO_2$.

Figure 8:
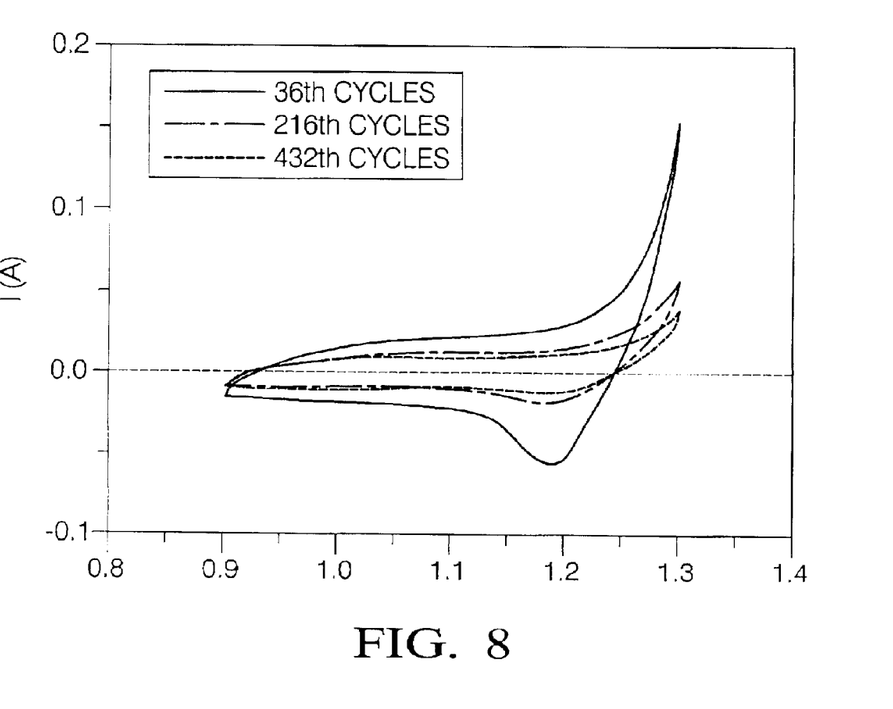
FIG. 8 is a graph illustrating the cycling voltametry of Example 2 at 75° C.
Figure 9:
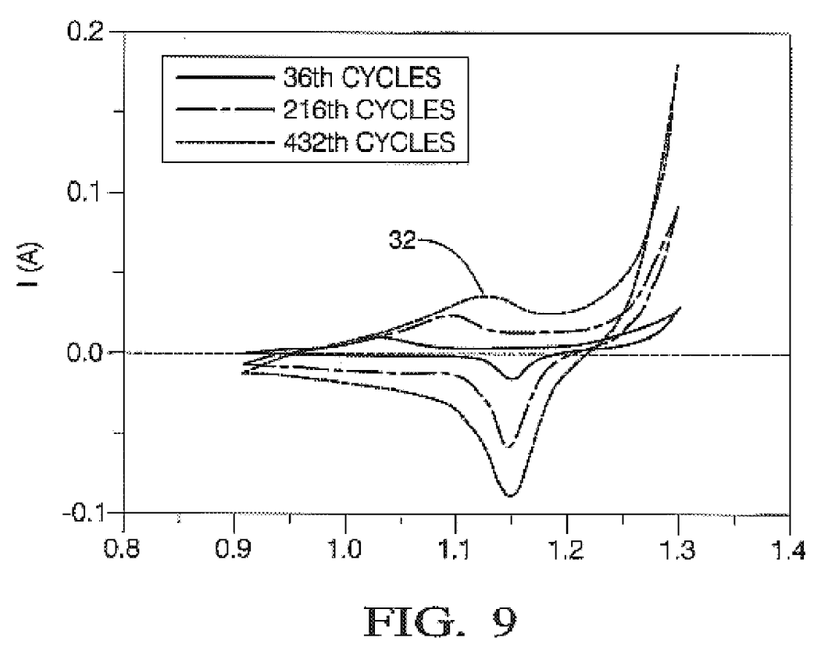
FIG. 9 is a graph illustrating the cycling voltametry of Comparative Example 1 at 75° C.

FIGS. 8 and 9 depict graphically the cycling voltametry evaluation of Example 2 and Comparative Example 1 respectively. The broad anodic current peak in the 0.95 to 1.2 V region of FIG. 9 (see #32, FIG. 9), represents localized pitting corrosion of the historical grid of Comparative Example 1. The absence of this broad anodic peak in the same range of FIG. 8, suggests the absence of such pitting corrosion in the preferred embodiment of Example 2.

Figure 10:
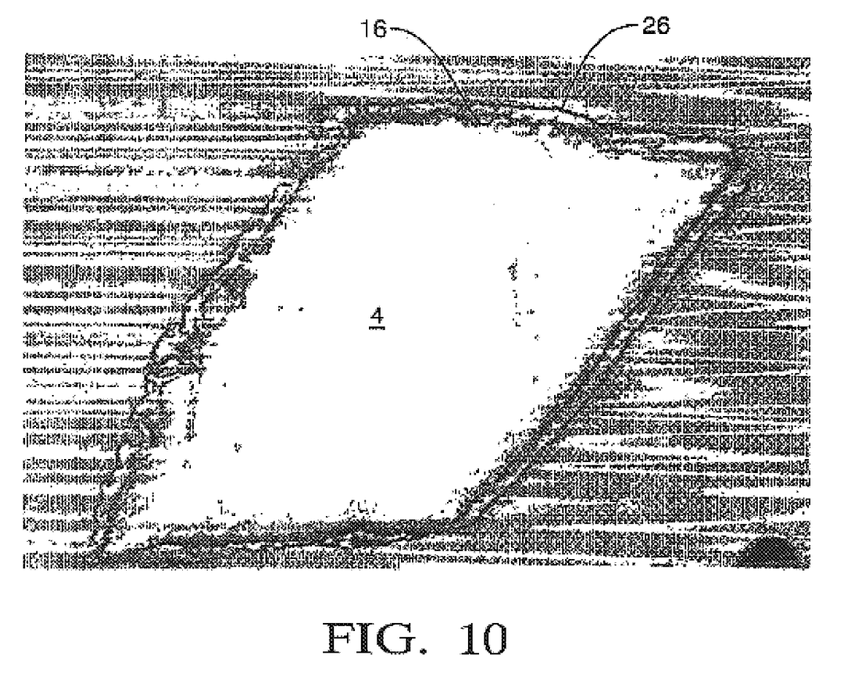
FIG. 10 is a metallography image of a cross section of the grid of Example 2 after 432 cycles.
Figure 11:
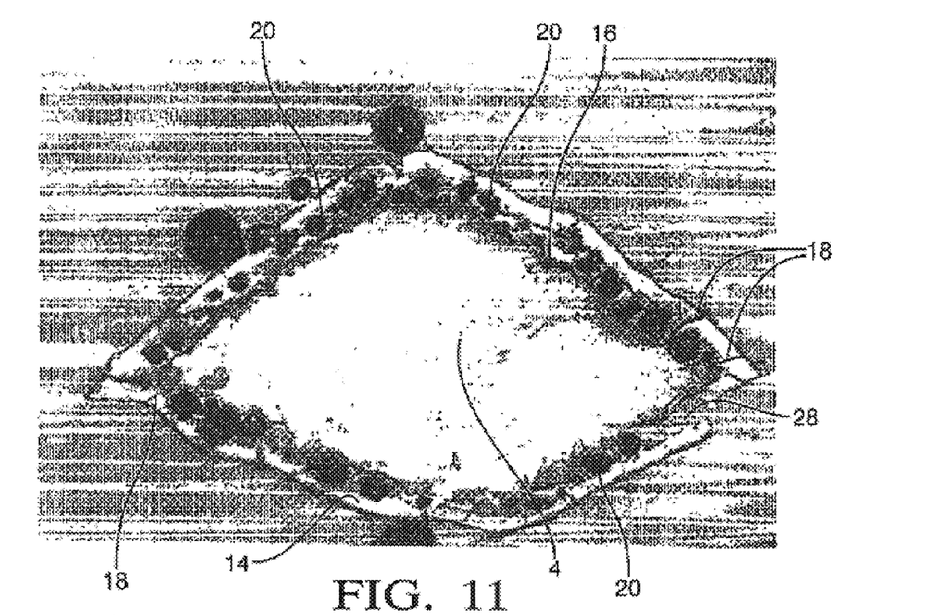
FIG. 11 is a metallography image of a cross section of the grid of Comparative Example 1 after 432 cycles.

FIG. 10 shows a cross section of Example 2, and FIG. 11 shows a cross section of the Comparative Example 1, both after the cycling voltametry evaluation. FIG. 10 is representative of the coating (similar to the prior art corrosion layer) that is well adhered to the grid wire. The corrosion layer of Comparative Example 2 shown in FIG. 11 however, clearly shows cracks, pits (represented by dark circles) and consumption of the grid metal wherein separation has occurred at the grid/corrosion layer interface (see FIG. 11, No. 28). Comparison of the preferred embodiment of Example 2 shown in FIG. 10 to Comparative Example 1 shown in FIG. 11 clearly and accurately depicts the improvement in high temperature operation of the present invention over that of historical Comparative Example 1.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. An electrode comprising:
   a noble-metal free grid comprising lead, wherein said grid has an essentially PbO free $PbO_2$ coating essentially covering the surface of said grid, wherein the surface area of said essentially PbO free $PbO_2$ coating exceeds the geometric surface area of said grid by more than about 60 area percent.

2. The electrode of claim 1, wherein said noble metal free grid further comprises calcium, tin, or a combination comprising at least one of the foregoing.

3. The electrode of claim 1, wherein said essentially PbO free $PbO_2$ coating comprises at least about 90 weight percent alpha-$PbO_2$.

4. The electrode of claim 1, wherein said essentially PbO free $PbO_2$ coating comprises at least about 90 weight percent beta-$PbO_2$.

5. The electrode of claim 1, wherein said essentially PbO free $PbO_2$ coating has an effective surface area greater than the geometric surface area of said grid.

6. The electrode of claim 1, wherein said essentially PbO free $PbO_2$ coating covers in excess of 99 area percent of the geometric surface area of said grid.

7. The electrode of claim 1, wherein said essentially PbO free $PbO_2$ coating covers in excess of 99.9% of the geometric surface area of said grid.

8. The electrode of claim 1, wherein said essentially PbO free $PbO_2$ coating has an average thickness of at least about 5 microns.

9. The electrode of claim 8, wherein said essentially PbO free $PbO_2$ coating has an average thickness of at most about 500 microns.

10. The electrode of claim 1, wherein said essentially PbO free $PbO_2$ coating has an average thickness of at least about 10 microns.

11. The electrode of claim 10, wherein said essentially PbO free $PbO_2$ coating has an average thickness of at most about 250 microns.

12. The electrode of claim 1, wherein said essentially PbO free $PbO_2$ coating has an average thickness of at least about 15 microns.

13. The electrode of claim 12, wherein said essentially PbO free $PbO_2$ coating has an average thickness of at most about 50 microns.

14. The electrode of claim 1, wherein said essentially PbO free $PbO_2$ coating has a density greater than about 8.5 grams per cubic centimeter.

15. The electrode of claim 1, wherein a cross-section of said electrode taken perpendicular to the surface of said coating comprises a continuous, or an essentially continuous interface at the boundary between said coating and said grid; wherein said essentially continuous interface is defined as being continuous on average at least about 1 micron at 80 times magnification.

16. The electrode of claim 15, wherein said essentially continuous interface is continuous on average at least about 5 microns at 80 times magnification.

17. The electrode of claim 16, wherein said essentially continuous interface is continuous on average at least about 15 microns at 80 times magnification.

18. The electrode of claim 1, wherein said coating has a percent void area at an interface between said coating and said grid less than about 50 area percent of the total area of said interface.

19. The electrode of claim 1, wherein said coating has a percent void area at an interface between said coating and said grid less than about 30 area percent of the total area of said interface.

20. The electrode of claim 1, wherein said coating has a percent void area at an interface between said coating and said grid less than about 10 area percent of the total area of said interface.

21. A method of making a battery comprising:
    introducing at least two electrodes into an outer case; and
    surrounding said electrodes with an electrolyte, wherein at least one of said electrodes is the electrode of claim 1.

22. A method of forming an electrode, comprising:
    applying an essentially PbO free $PbO_2$ coating to the surface of a noble-metal free grid comprising lead, wherein said coating essentially covers the surface of said grid, and wherein the surface area of said essentially PbO free $PbO_2$ coating exceeds the geometric surface area of said grid by more than about 60 area percent.

23. The method of claim 22, wherein said coating is applied to said grid by electrolytic deposition, non-electrolytic deposition, or a combination comprising at least one of the foregoing.

24. The method of claim 22, wherein said noble metal free grid further comprises calcium, tin, or a combination comprising at least one of the foregoing.

25. The method of claim 22, wherein said essentially PbO free $PbO_2$ coating comprises at least about 90 weight percent alpha-$PbO_2$.

26. The method of claim 22, wherein said essentially PbO free $PbO_2$ coating comprises at least about 90 weight percent beta-$PbO_2$.

27. The method of claim 22, wherein said essentially PbO free PbO2 coating has an effective surface area greater than the geometric surface area of said grid.

28. The method of claim 22, wherein said essentially PbO free $PbO_2$ coating covers in excess of 99 area percent of the geometric surface area of said grid.

29. The method of claim 22, wherein said essentially PbO free $PbO_2$ coating covers in excess of 99 area percent of the geometric surface area of said grid.

30. The method of claim 22, wherein said essentially PbO free $PbO_2$ coating has an average thickness of at least about 5 microns.

31. The method of claim 30, wherein said essentially PbO free $PbO_2$ coating has an average thickness of at most about 500 microns.

32. The method of claim 22, wherein said essentially PbO free $PbO_2$ coating has an average thickness of at least about 10 microns.

33. The method of claim 32, wherein said essentially PbO free $PbO_2$ coating has an average thickness of at most about 250 microns.

34. The method of claim 22, wherein said essentially PbO free $PbO_2$ coating has an average thickness of at least about 15 microns.

35. The method of claim 34, wherein said essentially PbO free $PbO_2$ coating has an average thickness of at most about 50 microns.

36. The method of claim 22, wherein said essentially PbO free $PbO_2$ coating has a density greater than about 8.5 grams per cubic centimeter.

37. The method of claim 22, wherein a cross-section of said electrode taken perpendicular to the surface of said coating comprises a continuous, or an essentially continuous interface at the boundary between said coating and said grid; wherein said essentially continuous interface is defined as being continuous on average at least about 1 micron at 80 times magnification.

38. The method of claim 37, wherein said essentially continuous interface is continuous on average at least about 5 microns at 80 times magnification.

39. The method of claim 37, wherein said essentially continuous interface is continuous on average at least about 15 microns at 80 times magnification.

40. The method of claim 22, wherein said coating has a percent void area at an interface between said coating and said grid less than about 50 area percent of the total area of said interface.

41. The method of claim 22, wherein said coating has a percent void area at an interface between said coating and said grid less than about 30 area percent of the total area of said interface.

42. The method of claim 22, wherein said coating has a percent void area at an interface between said coating and said grid less than about 10 area percent of the total area of said interface.

43. A method of forming an electrode, comprising:

electrolytically depositing an essentially PbO free $PbO_2$ coating onto the surface of a noble-metal free grid comprising lead, tin and calcium, wherein said coating has a thickness not less than 5 microns and not more than 500 microns, and wherein said coating covers all, or essentially all of the surface of said grid to produce a coated grid;

applying a paste comprising lead and lead oxide to the surface of said coated grid to produce a pasted grid;

contacting said pasted grid with steam for at least one hour to produce a steamed grid;

curing said steamed grid at about 50 percent humidity and about 55° C. for at least about 24 hours to produce a cured grid; followed by contacting said grid with aqueous sulfuric acid prior to passing an external electric current of sufficient voltage and amperage through said cured grid for a sufficient period of time to convert at least a portion of said applied paste into lead dioxide.

44. A battery comprising:

at least two electrodes disposed in an outer case and surrounded by an electrolyte, wherein at least one of said electrodes is the electrode of claim 43.

45. A method of making a battery comprising:

introducing at least two electrodes into an outer case; and surrounding said electrodes with an electrolyte, wherein at least one of said electrodes is the electrode of claim 43.

* * * * *